Figure 1:
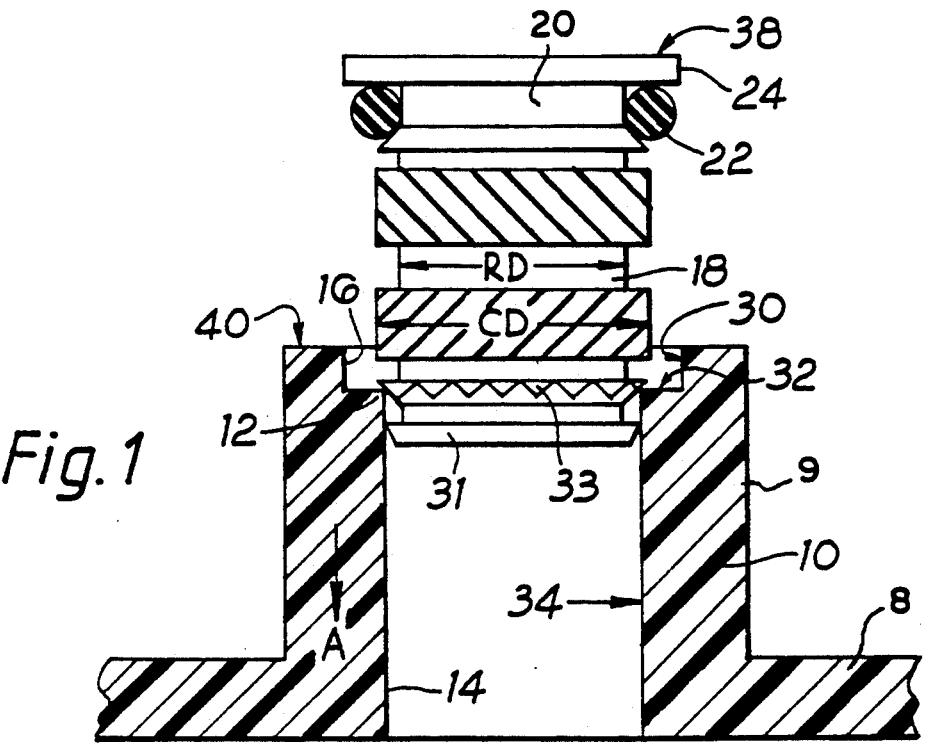

United States Patent [19]
Martin

[11] Patent Number: 5,266,258
[45] Date of Patent: Nov. 30, 1993

[54] METHOD OF SEALINGLY SEATING A METAL INSERT IN A THERMOPLASTIC COMPONENT

[75] Inventor: Paul A. Martin, Walsall, Great Britain

[73] Assignee: PSM International PLC, England, Great Britain

[21] Appl. No.: 919,942

[22] Filed: Jul. 27, 1992

[30] Foreign Application Priority Data

Jan. 15, 1992 [GB] United Kingdom ............... 9200849

[51] Int. Cl.⁵ .................. B29C 65/08; B29C 65/64
[52] U.S. Cl. ................................ 264/249; 264/23; 411/180; 425/517
[58] Field of Search ............ 411/180; 249/59; 264/23, 248, 249, 262; 425/517

[56] References Cited

U.S. PATENT DOCUMENTS

| | | | |
|---|---|---|---|
| 3,445,559 | 5/1969 | Siteman | 425/517 |
| 4,128,609 | 12/1978 | Rawson | 264/23 |
| 4,136,275 | 1/1979 | McCullough | 425/517 |
| 4,207,818 | 6/1980 | Hamisch, Jr. | 264/23 |
| 4,455,134 | 6/1984 | Biggs | 425/517 |
| 4,735,069 | 4/1988 | Steinbach | 264/23 |
| 4,828,294 | 5/1989 | Bounie et al. | 264/23 |
| 4,842,462 | 6/1989 | Tildesley | 249/59 |
| 4,850,097 | 7/1989 | Graf et al. | 264/262 |
| 4,869,603 | 9/1989 | Melzer et al. | 264/262 |
| 4,941,788 | 7/1990 | Highfield | 411/180 |
| 4,994,132 | 2/1991 | Liekens et al. | 425/517 |
| 5,115,552 | 5/1992 | Mattson | 264/262 |
| 5,131,795 | 7/1992 | Kobusch | 411/180 |

FOREIGN PATENT DOCUMENTS

| | | | |
|---|---|---|---|
| 2434486 | 2/1975 | Fed. Rep. of Germany | 425/517 |
| 2461142 | 3/1981 | France | 411/180 |
| 1279452 | 6/1972 | United Kingdom | 411/180 |
| 2221505 | 2/1990 | United Kingdom | 411/180 |

Primary Examiner—Jan H. Silbaugh
Assistant Examiner—Brian J. Eastley
Attorney, Agent, or Firm—Learman & McCulloch

[57] ABSTRACT

Method of installing an insert in a plastics body so as to provide a screw thread therein, the insert being of metal and formed with the screw thread, and in which the hole in the plastic which receives the insert is sealed, by providing the insert with an 'O' ring located in an external peripheral groove and projecting therefrom, the size and shape of the insert and hole being related and selected so that in axial displacement of the insert into the preformed hole accompanied by softening of the plastic caused by the fastener being preheated or by vibrations applied to the plastic via the fastener as it is inserted, the 'O' ring only comes into contact with unsoftened plastic and only comes into contact with plastic towards the end of the axial installation movement. This ensures a good seal between the 'O' ring and the plastic.

13 Claims, 2 Drawing Sheets

METHOD OF SEALINGLY SEATING A METAL INSERT IN A THERMOPLASTIC COMPONENT

This invention relates to fastener sealing systems.

BACKGROUND OF THE INVENTION

It is known from GB 1031583 to provide a screw with an elastomeric 'O' ring assembled thereto and located in a recess or groove extending around the shank of the screw under the screw head, so that when the screw is installed the head may be sealed. In this patent the screw may pass through a clearance hole in a sheet metal cabinet to engage a complimentary screw thread in a component inside the cabinet. Deformation of the 'O' ring by controlling the axial displacement, that is tightening the screw selectively, causes the material of the ring to flow into the clearance, and the ring is also compressed between the cabinet and the head. This provides the seal and perhaps aids security because of the frictional grip of the 'O' ring.

It is also well known to provide various machine or like components with 'O' rings located in peripheral grooves therein to seal against internal shoulders in a matching component. GB 2070712 is one example on the plug of a fluid valve.

In much of the prior art relating to 'O' rings there is a screw which can be selectively and controllably tightened to cause the 'O' ring deformation to the desired extent. In all of the other examples of prior art known to the Applicant the 'O' ring is fitted to a shaft or like extending into a pre-formed hole as a so called piston fit and all of the parts are of known dimensions so that 'O' ring compression and hence sealing can be predicted and calculated.

In the manufacture of thermoplastics moulded components it is often required to provide a screw thread to receive a fixing screw. The plastics material is often incapable of carrying the thread, as least with adequate mechanical strength, and the conventional solution is to provide a metal insert which has the screw thread provided in the bore and instal this insert in a pre-formed hole in the plastic by various methods. The insert has fins, ribs, teeth or the like on its exterior to provide interstices which key with the plastic and become filled by the plastic so as to fix the insert in the component. Usually the pre-formed hole in the plastic is blind and there is then no sealing problem.

However, modern plastics technology extends the use of plastics for an increasingly wide range of components, and now calls for screw threads in relatively thin sections of plastic. Conventional 'O' ring screws could provide a seal between the screw and insert if used in such component but not between the insert and plastic because the insert is not selectively axially displaced and is in fact usually inserted with a fixed displacement, for example until the insert bottoms in a hole or until the top of the insert becomes flush with the component around the hole. Attempts to provide an 'O' ring on the exterior of the insert in a similar place to that on a screw seem doomed to failure for this first reason of lack of selective axial movement and also secondly because the insert installation technique involves either cold pressing, which might shear the 'O' ring, or softening of the plastic for example by a heated insert or use of high frequency vibrations which would displace the plastic away from the 'O' ring leaving it in undeformed and unsealing condition.

The only known solution for this plastic moulding involving 'O' rings is to provide a through bore with a shoulder, that is a reduced diameter portion at the bottom of the hole, place an 'O' ring into the hole to rest on the shoulder, then instal the insert by the conventional techniques. The axial displacement of the insert into the component compresses the 'O' ring between the insert and the shoulder to a known extent in order to provide the seal. But this technique is considered unsatisfactory. Many inserts are only a few millimeters in diameter and hence a relatively tiny 'O' ring has to be placed in the component and it is easy for it to be overlooked and omitted, or for it to be misplaced so that it never goes into proper sealing position. Furthermore, if a component is of the order of 7 or 10 mm thick, and a shouldered hole is to be provided, it is inevitable that the reduced diameter hole portion will be of very small axial thickness—otherwise there is insufficient of the hole used for anchorage of the insert. So the thin flange left by the shoulder can easily deform and the result is that the 'O' ring is not placed under the designed compressive load and again is not in sealing condition.

Consequently, alternative means for sealing in such situations are often used including the provision of a gasket between the component and the screw so as to overlie the end of the insert and the component, or the use of sealing compound applied. These solutions also have disadvantages, and the object of the present invention is to solve the problem and provide a new and improved solution.

SUMMARY OF THE INVENTION

According to the invention, a method of seating a belted screw threaded insert in a thermoplastic component comprises providing a bore cavity in the component, providing a metal insert carrying the screw thread, selecting the dimensions of the cavity relative to the insert such that when the insert is positioned relative to the cavity prior to installation, a pilot portion of the insert is received in said cavity, and part of the insert adjacent the pilot contacts a rim of the cavity at the end of the pilot receiving part, then locally softening the plastic forming the cavity wall by means of heat conducted from the metal insert or ultrasonic vibrations applied via the metal insert, whilst axially displacing the insert into said cavity, and is characterized in that firstly the metal insert comprises an external peripheral groove in which an elastomeric 'O' ring is located and from which said ring projects, and secondly that the said selected dimensions of the insert, the groove, the 'O' ring and the cavity ensure that the 'O' ring is not in contact with the plastic until the final part of the axial seating movement of the insert.

According to one aspect of the invention the insert has a head remote from the pilot, the 'O' ring is located immediately adjacent said head, the cavity has an enlarged section or counter bore at the end first encountered by the pilot in installation, and said rim is between the counter-bore and the main cavity.

The consequence of this arrangement is that the softening of the plastic takes place around and along the main (smaller) part of the cavity, ahead of the 'O' ring which in fact only makes contact with the plastic in the final part of the displacement of the fastener into the component, and then contacts an area which has been largely unaffected by the softening.

According to another aspect of the invention the 'O' ring is provided on the pilot portion which is a clearance fit in a first portion of said cavity connected to a second portion in which the 'O' ring is a compressive fit, by way of a tapered section.

The consequence of this second arrangement is that the 'O' ring moves through the component ahead of the softened zone and is spaced from the plastic until the final part of the movement when it then encounters plastic largely unaffected by the softening.

The invention further consists in fasteners adapted in use in carrying out the method of the invention.

Hence the invention broadly is based on the provision of means for ensuring that the 'O' ring is brought into a sealing and compressed condition by contact with largely unsoftened plastic. This is based on the discovery or realization that the softening effect with the ultrasonic insertion method or with the preheated insert method is extremely localized so that even with thin sections of plastic, there are zones of the plastic which are unsoftened even along the length of a cavity which is only a few millimeters long. Hence, careful fastener design and cavity design enable the 'O' ring to avoid contact with the softened plastic at all times.

However it is also believed to a degree the 'O' ring may be put into an appropriate compression for sealing even by the softened plastic, so that instead of the 'O' ring acting in the same way as the ribs, teeth, fins or equivalent on the insert exterior which cut or displace the softened plastic to make way for the insert as it is pressed home in the component, the 'O' ring deflects or is deformed as it is displaced even by the softened plastic, so that it (the 'O' ring) provides the requisite seal when the plastic re-sets. Nonetheless, the preferred designs of insert and hole and preferred installation methods are such as to minimize or avoid contact with the softened plastic, for maximum efficiency.

THE DRAWINGS

Figure 2:
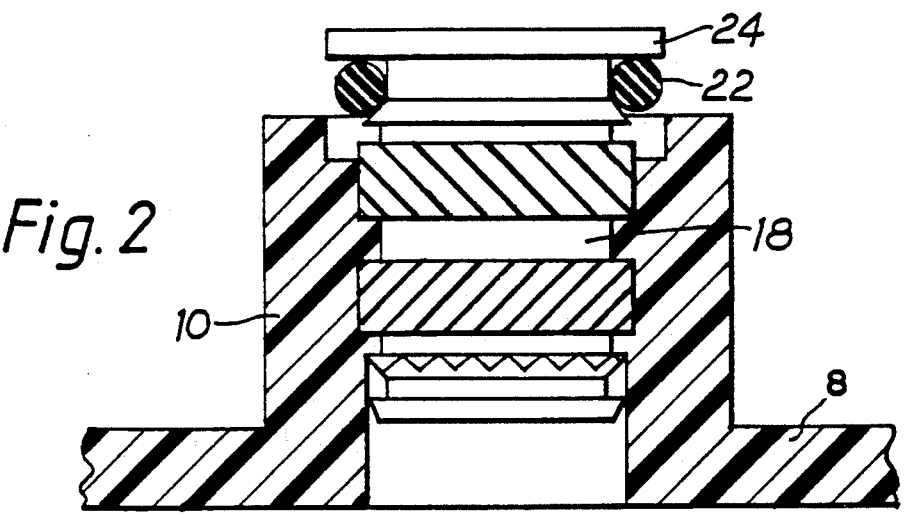
Figure 3:
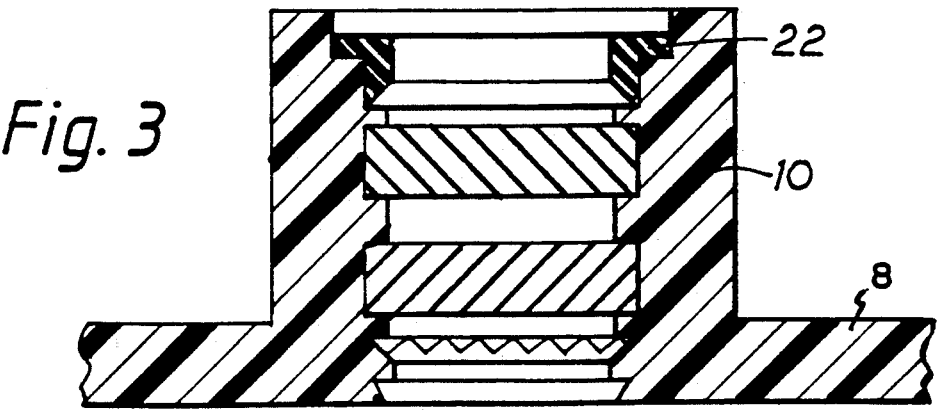
Figure 4:
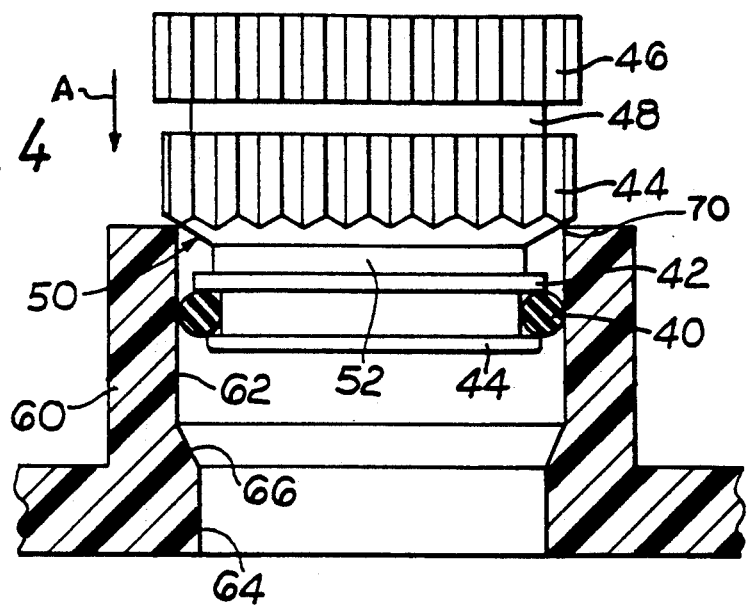
Figure 5:
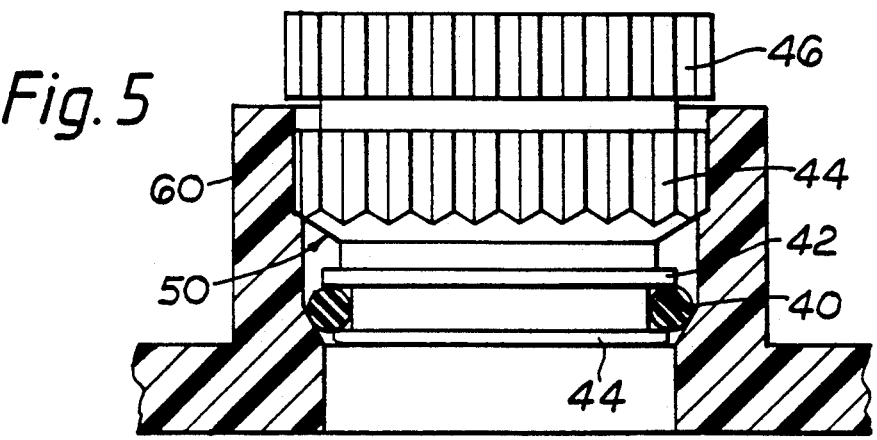
Figure 6:
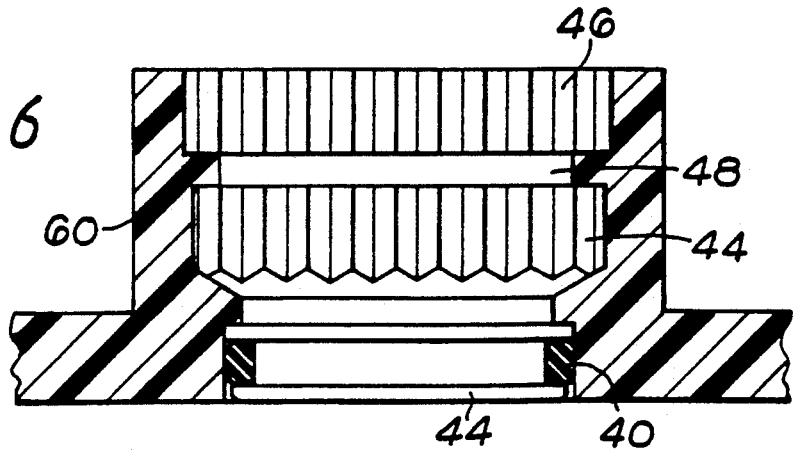

Two embodiments of the invention are illustrated with reference to the accompany drawings in which:

FIGS. 1 to 3 show three successive steps in the installation of a first design insert in its cavity, and FIGS. 4 to 6 similarly for a second design.

THE DISCLOSED EMBODIMENTS

In FIGS. 1 to 3 the plastic component 8 has an upstanding part 9 within which is a smooth bore or cavity 10 which tapers along end 14, although a very small degree of taper is used, typically of the order of 0.5 degree.

At the entry end of the cavity there is an enlargement or counterbore 16.

The insert essentially comprises a metal bush 18 with an appropriate pattern of ribs, teeth or fins on its exterior, together with an exterior annular groove 20 at one end receiving and locating an elastomeric 'O' ring 22 made of an appropriate rubber for example a silicon rubber or a nitrile rubber depending on the intended method of installation. The insert includes a head 24 which is cylindrical.

In use, the insert may be supported on a tool and located in the entry end 12 of the cavity 10. The insert has a toothed frusto-conical portion 33 near the opposite end, and a smooth, untoothed portion 31 extending from the portion 33 to the end. The pilot portion is dimensioned to be received in the cavity 10 and the frusto-conical portion rests on the rim at the entry end of that cavity.

The root diameter RD of the insert is measured between axially opposite ribs, teeth or like, that is the basic external body diameter is less than the diameter of the cavity at 12, but the diameter CD over the crests of the teeth is larger than that of the cavity 10 at 12. The insert is therefore unable to move into the hole until the plastic is displaced due to softening, or the plastic is cut due to applied pressure. The actual installation is a combination of these two acts.

The softening is accomplished by applying ultrasonic vibrations to the tools supplying the fastener. Alternatively the insert is preheated and the plastic is heat softened. The heat or the vibrations are transferred to the plastic only at the points of contact between the insert and the plastic, i.e. at the crests of the teeth. At the same time the fastener is pressed in the direction of arrow A and the teeth begin to cut complementary grooves in the plastic and displace the cut plastic into the inter-tooth spaces or grooves (interstices).

The ultrasonic installation technique and the heat technique are well known and standard practice in the art.

However it is particularly to be observed that the critical plastic surfaces for sealing with the 'O' ring are firstly and primarily the cylindrical surface 30 of the enlarged portion, and secondly the area of the planar face or shoulder 32 especially near to the surface 30. The vibrations applied to the plastic are applied by the teeth in the direction of inward movement of the insert and effect softening of the cavity wall 34 but not to the important sealing faces which are not disturbed or softened to any material extent.

The deformation of the 'O' ring may be controlled by pre-moulding the cavity and arranging for the insertion step to be complete upon final axial movement of the insert, i.e., when the end face 38 of the insert is flush and co-planar with the end face of the component.

It is an important aspect of the invention that the head 24 itself is a clearance fit in the enlarged portion 16 of the cavity. Sealing is not intended to be provided, by a tight fit at this point, but by deformation of the 'O' ring to fill the groove 20 and occupy the spaces between the groove and the surfaces 30, 32 as is shown in FIG. 3. The clearance between the head and plastic ensures that there is little flow of heat from the head to the plastic and hence avoids softening of the critical surface 30 in the same way as that clearance avoids transmission of ultrasonic vibrations from the head to the surface 30, according to the installation method used.

The insert selected for the purposes of illustration is one well known in the trade comprising bands which are helically knurled in opposite directions in order to provide the teeth, and this assists in providing a particularly efficient anchorage of the insert against torque loads applied in either direction as well as against pullout and screw-out.

In the arrangement shown in FIGS. 4 to 6 the use of a head is avoided. The 'O' ring 40 is located in a groove defined between peripheral ribs 42 44 essentially at the leading end, i.e. the first end entered into the hole during installation. The illustrated insert comprises two knurled bands 44 46 separated by the mid-groove 48. In this instance the knurling creates straight teeth or ribs which are aligned on the two bands. The band 46 is of larger diameter than the band 44. The smaller band has a frusto-conical end face 50 extending into a groove 52.

The component 60 in this instance has a main cylindrical cavity 62, a shorter and smaller cylindrical cavity extension 64, and a tapered section 66 connecting the two. These together form a through bore extending through the component.

The extension 64 is of a diameter selected to be slightly greater than the diameter of the parts 42, 44: for example if the maximum diameter of the parts 42, 44 is 21.50 mm, the minimum diameter of extension 64 will be 22 mm. The 'O' ring which projects well beyond parts 42, 44 in its undeformed state may therefore be compressed to fill the groove and provide a good seal when properly positioned in the bore part 64.

The axial length of the cavity 62 is approximately equal to the axial length of the sum of the parts 44 46 48, and greater than the axial length of the 'O' ring section including parts 42 52 and 50. The actual length of the fastener is equal to that of the complete cavity 62 66, 64.

The diameter of the cavity part 62 is midway between the root and crest diameters of the smaller knurled band 44 and greater than that of the groove 48.

When the insert is positioned ready for installation, the frusto-conical shoulder 50 rests on the rim 70 of the hole. The 'O' ring is spaced from the plastic at all points. The insert is displaced axially in direction A accompanied by heat or vibration softening of the plastic of the cavity wall and the teeth or ribs cut and displace the plastic so that it flows into and along the intertooth grooves to fill the groove 48 and the groove 52.

The alignment of the teeth on the two bands means that those on the larger band 46 follow those on the band 44, but because of the extra diameter displace more plastic in the same way.

When the 'O' ring 40 enters the tapered section 66 it is compressed radially inwards: this is the first contact of the 'O' ring with the plastic and it is particularly to be noted that it occurs ahead of the area softened by contact between the heated or vibrating insert, and in an unaffected area of plastic. The angle of the taper should be as gentle as possible: large angles might result in shear damage to the ring, but small angles create in design because of the available length of cavity. An angle of 20 degrees to the insert axis has been found suitable and acceptable.

The illustrated insert in FIGS. 4 to 6 has, as noted, straight teeth which in fact provide the best angular or torque resistant hold but poor pull-out resistance. Designs of inserts using wholly peripheral ribs, teeth or fins are known, providing best pull-out resistance but poor torque characteristics.

The insert of FIG. 1 is of course a compromise in various respects in order to provide torque resistance in both directions as well as pull-out resistance and screw-out resistance—that is low torque resistance in one direction even if high in the opposite direction. Selection of the insert design will depend upon requirements for the various factors.

I claim:

1. A method of sealing seating a metal insert in a cavity having a cylindrical wall formed in a thermoplastic component, said insert having a threaded bore, a smooth pilot portion at one end having an external diameter no greater than that of said cavity wall, and an externally toothed portion axially spaced from said pilot portion having an external diameter greater than that of said cavity wall, said insert having an external annular groove axially spaced from said pilot portion and said toothed portion, and a deformable O-ring accommodated in said groove having an uncompressed diameter greater than that of said cavity wall, said method comprising introducing said pilot portion of said insert to one end of said cavity; moving said insert axially inward of said cavity while simultaneously softening a portion of the cavity wall in a direction inward of said one end of said cavity and enabling the softened thermoplastic material of said wall to flow into interstices between teeth of said toothed portion; and deforming said O-ring during the final axial inward movement of said insert to form a seal between said insert and an unsoftened portion of said cavity wall.

2. The method according to claim 1 wherein said insert has an enlarged head at that end of the insert remote from said pilot portion and wherein said annular groove is adjacent said head.

3. The method according to claim 1 including a counterbore at said one end of said cavity forming a shoulder, and wherein said O-ring is deformed to form a seal between said O-ring and said shoulder.

4. The method according to claim 1 wherein said cavity has a first relatively large diameter portion extending inward from one side of said component toward the opposite side thereof, and a second relatively small diameter portion communicating with said first portion via a tapered section.

5. The method according to claim 4 wherein said O-ring sealingly engages said second portion.

6. The method according to claim 1 wherein said pilot portion is frusto-conical and tapers in a direction inward of said cavity.

7. The method according to claim 1 wherein said externally toothed portion of said insert is frusto-conical and tapers in a direction inward of said cavity.

8. The method according to claim 1 wherein said externally toothed portion has helical teeth.

9. The method according to claim 1 wherein said externally toothed portion has axial teeth.

10. The method according to claim 1 wherein said externally toothed portion includes two bands of teeth axially spaced by an annular groove.

11. The method according to claim 10 wherein the teeth of each of said bands are helical.

12. The method according to claim 11 wherein the teeth of respective bands spiral in opposite directions.

13. The method of claim 10 wherein the teeth of each of said bands are axial and spaced from one another by an annular groove.

* * * * *

UNITED STATES PATENT AND TRADEMARK OFFICE
CERTIFICATE OF CORRECTION

PATENT NO. : 5,266,258
DATED : November 30, 1993
INVENTOR(S) : Paul A. Martin

It is certified that error appears in the above-indentified patent and that said Letters Patent is hereby corrected as shown below:

Column 2, line 34, change "belted" to -- sealed --; line 35, after "bore" insert -- or --; line 61, after "place" insert -- primarily --.

Column 4, line 5, cancel "10"; line 6, change "hole" to -- cavity 10 --;

Column 5, line 41, after "create" insert -- difficulty --.

Signed and Sealed this

Seventeenth Day of May, 1994

Attest:

BRUCE LEHMAN

*Attesting Officer*     *Commissioner of Patents and Trademarks*